United States Patent [19]

Chen

[11] Patent Number: 5,052,072
[45] Date of Patent: Oct. 1, 1991

[54] WINDSHIELD-WIPER END CLIP

[75] Inventor: Liang-Yuan Chen, Taipei, Taiwan

[73] Assignee: China Siper Special Rubber Co. Ltd., Taipei, Taiwan

[21] Appl. No.: 491,746

[22] Filed: Mar. 12, 1990

[30] Foreign Application Priority Data

Dec. 8, 1989 [GB] United Kingdom ................. 8927809

[51] Int. Cl.$^5$ ............................................. B60S 1/38
[52] U.S. Cl. ............................ 15/250.42; 15/250.31; 15/250.36
[58] Field of Search ........... 15/250.31, 250.32, 250.33, 15/250.42, 250.41, 250.36

[56] References Cited

U.S. PATENT DOCUMENTS

| | | | |
|---|---|---|---|
| 3,626,544 | 12/1971 | Lopez et al. | |
| 3,919,736 | 11/1975 | Bourassa et al. | 15/250.42 |
| 4,009,503 | 3/1977 | Sharp | 15/250.42 |
| 4,156,951 | 6/1979 | Sharp | 15/250.42 |
| 4,389,747 | 6/1983 | Riester | 15/250.42 |
| 4,442,566 | 4/1984 | Sharp | 15/250.42 |
| 4,457,041 | 7/1984 | Kimber et al. | 15/250.42 |
| 4,501,043 | 2/1985 | Plisky | 15/250.42 |
| 4,566,147 | 1/1986 | Baerenwald et al. | 15/250.42 |
| 4,583,259 | 4/1986 | Will | 15/250.42 |

Primary Examiner—Harvey C. Hornsby
Assistant Examiner—Gary K. Graham
Attorney, Agent, or Firm—Herbert Dubno; Andrew Wilford

[57] ABSTRACT

A retaining clip is used in combination with a wiper comprising a flexible wiper blade having a longitudinally extending headed rib and a resilient backing rail formed with a longitudinally extending and forwardly open narrow-neck slot in which the rib is received and captured, with an aperture opening at a back face of the rail spaced longitudinally from an end of the rail, and with a pair of laterally oppositely open grooves and having a back face directed away from the blade. A yoke assembly has a plurality of longitudinally spaced claws engaging over the rail and into the grooves thereof. The clip is unitarily formed with an end wall normally lying against the end of the rail blocking the slot thereof, a pair of parallel sides extending longitudinally from the end wall and normally lying over the grooves adjacent the end of the rail, and a pair of parallel arms extending from the sides and normally lying flat on the back face of the rail. These arms normally lie under a respective claw. In addition a tab extending longitudinally from the end wall between the arms normally lies flat on the back face of the rail and a spreadable stud projects transversely from the tab through the aperture into the slot and fits tightly in the aperture.

5 Claims, 2 Drawing Sheets

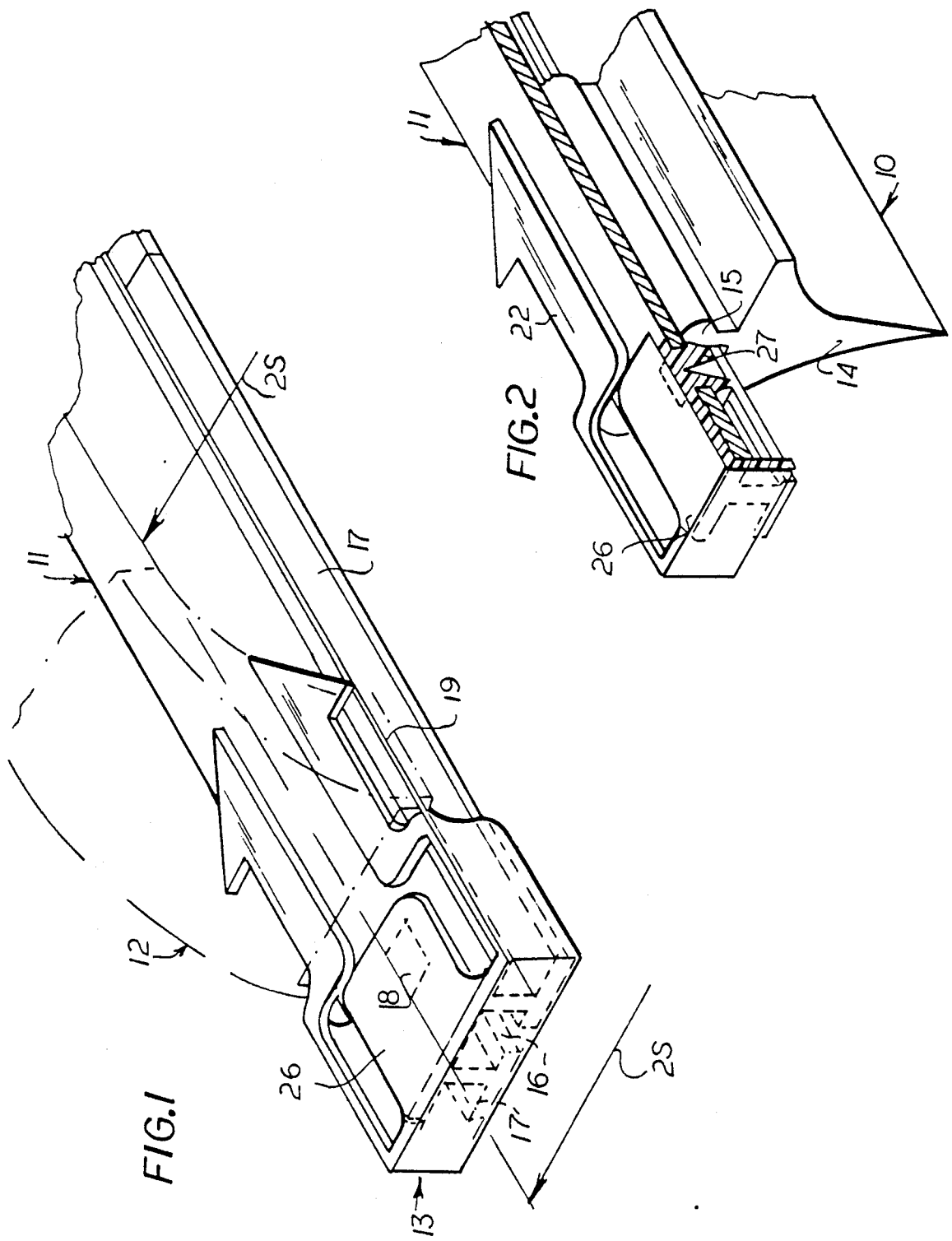

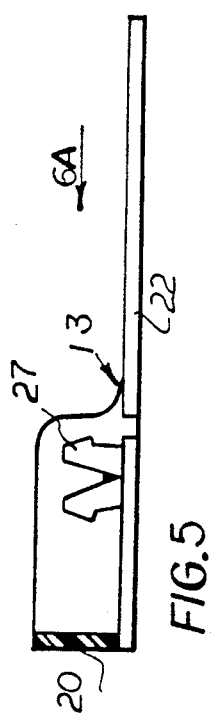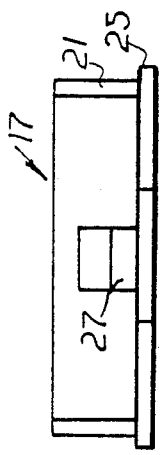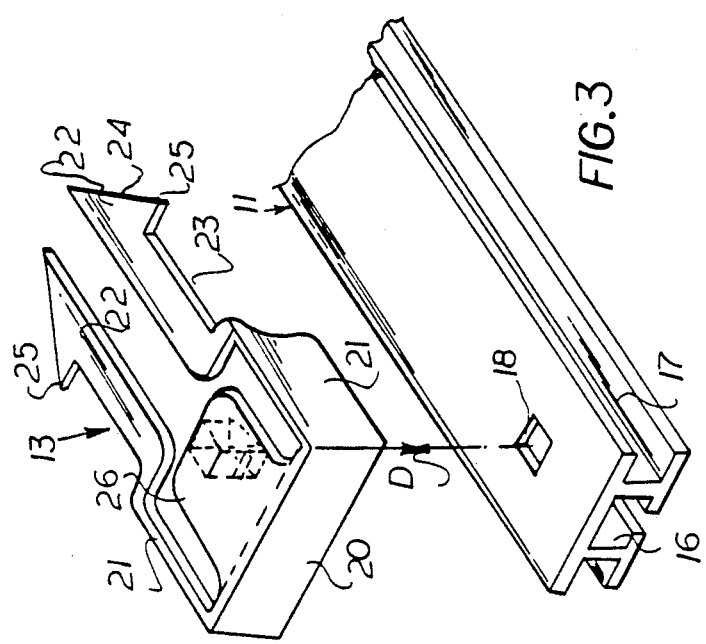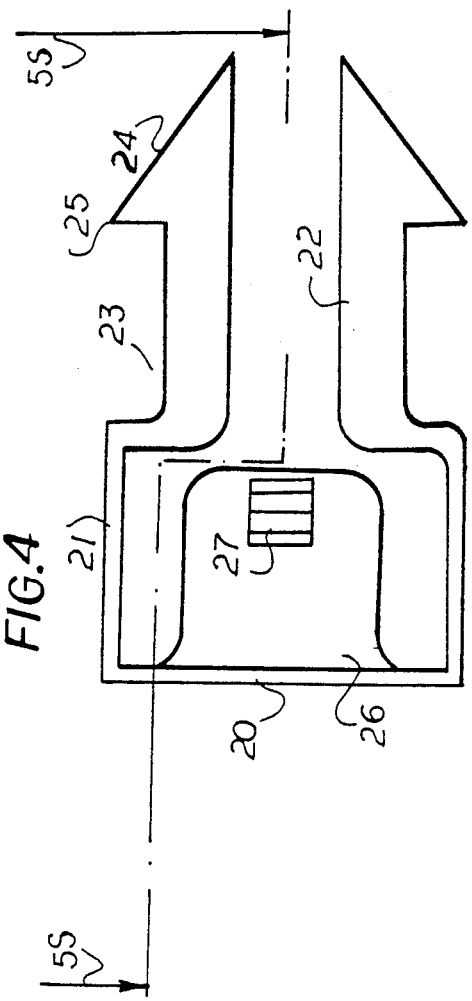

WINDSHIELD-WIPER END CLIP

FIELD OF THE INVENTION

The present invention relates to a windshield wiper. More particularly this invention concerns an end clip for securing the wiper blade in the wiper arm of a windshield-wiper assembly.

BACKGROUND OF THE INVENTION

A standard wiper comprises a relatively flexible elastomeric blade having a V-section front part that rides on the windshield and a back part formed as a T-section rib that is received in a complementary slot of a somewhat stiffer synthetic-resin backing rail. This rail itself is normally formed along its side edges with oppositely outwardly open grooves in which engage tabs of claws of a metallic yoke assembly. In turn this yoke assembly is formed by a main rigid yoke that itself is carried on the vehicle's wiper arm and whose ends carry short secondary yokes whose ends are formed with the claws that engage in the grooves of the backing rail. Thus the blade and rail can bend to conform to the different curvatures of the windshield it must sweep over.

As described in U.S. Pat. No. 4,156,951 of Sharp the blade is secured to the rail by a removable metallic end clip having a base that lies across and blocks the slot of the backing rail or strip and from which projects a pair of diverging arms that lie on the back face of the backing strip. These arms can be elastically pushed together and are formed as barbs so that they can be inserted through a claw at the end of the wiper. Thus the clip serves the double purpose of preventing the blade from slipping longitudinally out of the backing rail and of holding the rail and blade on the yoke assembly.

In order to hold the blade somewhat offset from the end of the guide rail the above-described Sharp end clip has a short bent-over tab projecting inward from its base into the slot of the rail and engaging the end of the headed rib on the back edge of the blade. This clip therefore holds the blade in place and removal of this clip makes swapping out the blade for a new one fairly easy.

A disadvantage of this assembly is that it is an expensive metallic item in a highly competitive field where costs must be held down wherever possible. The clip can rust in place, and assembly requires the wiper arm to be pulled away from the car so that the clip can be meticulously inserted into the end of the guide rail once the blade is in place.

OBJECTS OF THE INVENTION

It is therefore an object of the present invention to provide an improved end clip for a windshield wiper.

Another object is the provision of such an improved end clip for a windshield wiper which overcomes the above-given disadvantages, that is which is of very inexpensive and durable construction and which is easier to mount in place than the above-described prior-art system.

SUMMARY OF THE INVENTION

A retaining clip according to this invention is used in combination with a wiper comprising a flexible wiper blade having a longitudinally extending headed rib and a resilient backing rail formed with a longitudinally extending and forwardly open narrow-neck slot in which the rib is received and captured, with an aperture opening at a back face of the rail and spaced longitudinally from an end of the rail, and with a pair of laterally oppositely open grooves and having a back face directed away from the blade. A yoke assembly has a plurality of longitudinally spaced claws engaging over the rail and into the grooves thereof. The clip according to the invention is unitarily formed with an end wall normally lying against the end of the rail blocking the slot thereof, a pair of parallel sides extending longitudinally from the end wall and normally lying over the grooves adjacent the end of the rail, and a pair of parallel arms extending from the sides and normally lying flat on the back face of the rail. These arms normally lie under a respective claw. In addition a tab extending longitudinally from the end wall between the arms normally lies flat on the back face of the rail and a spreadable stud projects transversely from the tab through the aperture into the slot and fits tightly in the aperture.

According to another feature of this invention the stud blocks the slot and forms a stop for the blade. The clip is unitarily formed of a resilient synthetic resin and the stud is split and has a pair of side parts that are elastically deflectable toward and away from each other. This stud is a tight force-fit in the aperture which itself is of polygonal shape. The arms have points normally projecting laterally past the rail.

Thus with the system of this invention it takes biaxial action to disassemble the structure, that is the sides of the clip must be pushed together while the clip is pulled back, making it impossible for normal use or vibration to shake the assembly apart. When together the arms and the stud-carrying tab are captured under the claws of the yoke so that any pushing of the stud out of the aperture is effectively impeded, making the device very secure. On the other hand assembly is as simple as pushing the clip down over the fitted-together blade and rail and then sliding the clip/blade/rail assembly longitudinally into the claws of the support yoke.

DESCRIPTION OF THE DRAWING

The above and other objects, features, and advantages will become more readily apparent from the following, reference being made to the accompanying drawing in which:

FIG. 1 is a perspective view of an end of a wiper assembly according to this invention;

FIG. 2 is a view like FIG. 1 but showing the yoke claw and in a section taken along line 2S—2S of FIG. 1;

FIG. 3 is an exploded view of the assembly;

FIG. 4 is a top view of the clip according to the invention;

FIG. 5 is a section taken along line 5S—5S of FIG. 4; and

FIG. 6 is an end view taken in the direction of arrow 6A of FIG. 5.

SPECIFIC DESCRIPTION

As seen in FIGS. 1 and 2 a wiper assembly basically comprises a blade 10 made of a very flexible elastomer, a backing strip or rail 11 made of a somewhat less flexible synthetic resin, a yoke assembly made of metal and having a claw 12, and a retaining clip 13 made of a stiff but deformable synthetic resin.

The blade 10 has a V-section lip 14 that rides on the windshield and a back surface that lies against the front surface of the rail 11 and that is formed with a headed rib 15. The rail 11 is formed with a forwardly open narrow-neck slot 16 in which this rib 15 is captured and has sides forming laterally oppositely open grooves 17. In addition the back face of this rail 11 is formed adjacent one end with a square aperture 18 opening downward into the slot 16 at a short spacing from the end of the rail 11 where the slot 16 and grooves 17 open longitudinally. The yoke 12 has claws 19 that engage in the grooves 17. Normally several such claws 19 spaced longitudinally along the assembly carry the blade 10 and rail 11 as is well known in the art (see above-cited U.S. Pat. No. 4,156,951).

The clip 13 according to this invention has an end wall 20 that lies flat against the end of the rail 11. A pair of identical side flanges 21 that overlie and laterally close end portions of the grooves 17 extend longitudinally from the ends of the end wall and are unitarily formed with arms 22 that extend longitudinally parallel to each other and that lie flat atop the back face of the rail 11. Each arm 22 forms a laterally outwardly open notch 23 of rectangular shape and is formed with an inclined front edge 24 defining a point 25 that normally projects laterally slightly past the longitudinal edge of the back face of the rail 11.

In addition the upper edge of the end wall 20 of the clip 13 is formed with a flat longitudinally projecting tab 26 that also lies flat atop the back face of the rail 11 and that is formed with a bifurcated stud 27 of generally square section that can fit through the complementarily shaped hole 18. This stud 27 has an enlarged front end that can be compressed as it is forced through the hole 18 but that spreads once through to hold the clip 13 solidly in place on the rail 11.

With the system of this invention a blade 10 is used that is slightly shorter than the rail 11. For initial assembly the rib 15 of the blade 10 is slid into the slot 16 until the trailing end of the blade 10 is recessed in the slot 16 slightly past the aperture 18. Then the clip 13 is pressed down in transverse direction D onto the rail 11 to force the stud 27 through the aperture 18, leaving the tab 26 and arms 22 lying flat on the back face of the rail 11.

The thus assembled parts 10, 11, and 13 are then threaded through the yoke 12 until the claws 19 fit into the cutouts 23. This takes place with some inward camming of the arms 22 by engagement of the claws 19 with the camming edges 24 and the arms 22 pop elastically back out once the claws 19 are past the points 25, thereby solidly retaining the assembly together. The end of the blade 10 will meanwhile abut the stud 27 so that it will remain somewhat inward of the end of the wiper assembly.

For changing a wiper refill comprised of a blade 10, rail 11, and clip 13, the two sides 21 are pressed together to bring the points 25 inside the claws 19 and simultaneously the clip 13 is pulled longitudinally out to slide the clip 13 and rail 11 outward at least until the arms 22 are clear of the end claw 12.

I claim:

1. A retaining clip for use in combination with a wiper comprising:
    a flexible wiper blade having a longitudinally extending headed rib;
    a resilient backing rail formed with a longitudinally extending and forwardly open narrow-neck slot in which the rib is received and captured, with a polygonal aperture opening at a back face of the rail spaced longitudinally from an end of the rail, and with a pair of laterally oppositely open grooves and having a back face directed away from the blade; and
    a yoke assembly having a plurality of claws each engaging over the rail and into the grooves thereof, the retaining clip being releasably fitted to the end of the rail and unitarily formed with
    an end wall normally lying against the end of the rail blocking a longitudinal opening of the slot thereof;
    a pair of parallel sides extending longitudinally from the end wall and normally lying over the grooves adjacent the end of the rail;
    a air of parallel arms extending from the sides and normally lying flat on the back face of the rail, the arms normally lying under a respective claw, the arms having points that normally project laterally past the rail, whereby the points can retain the clip in the respective claw;
    a tab extending longitudinally from the end wall between the sides and normally lying flat on the back face of the rail; and
    a spreadable split stud of polygonal-section projecting transversely from the tab through the aperture into the slot and having a pair of side parts that are elastically deflectable toward and away from each other and fitting complementarily in the aperture thereby locking said clip to said rail, the stud projecting into the slot, being engageable therein with an end of the blade, and thereby forming an end stop for the blade.

2. The retaining clip defined in claim 1 wherein the clip is unitarily formed of a resilient synthetic resin.

3. The retaining clip defined in claim 1 wherein the stud is a tight force-fit in the aperture.

4. The retaining clip defined in claim 3 wherein the aperture is of polygonal shape.

5. The retaining clip defined in claim 4 wherein the stud is of polygonal section complementary to the aperture.

* * * * *

UNITED STATES PATENT AND TRADEMARK OFFICE
CERTIFICATE OF CORRECTION

PATENT NO.  : 5 052 072
DATED       : 1 October 1991
INVENTOR(S) : Liang-Yuan CHEN It is certified that error appears in the above-identified patent and that said Letters Patent is hereby corrected as shown below:

On title page, Item [73] should read:
-- China Wiper Special Rubber Co. Ltd. --

Col. 4, line 26 should read:
-- a *pair* of parallel arms extending ... -- .

Signed and Sealed this

Sixteenth Day of February, 1993

*Attest:*

STEPHEN G. KUNIN

*Attesting Officer*   Acting Commissioner of Patents and Trademarks